I. E. SPRY.
PLATE LIFTER.
APPLICATION FILED APR. 2, 1909.
923,906.
Patented June 8, 1909.
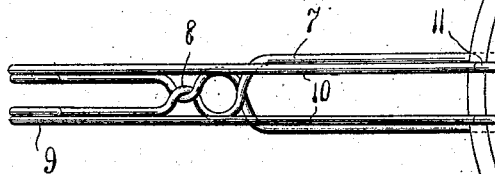
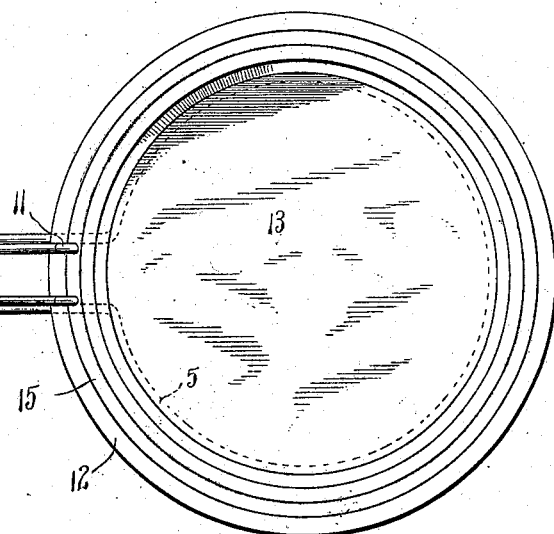
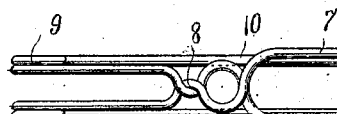
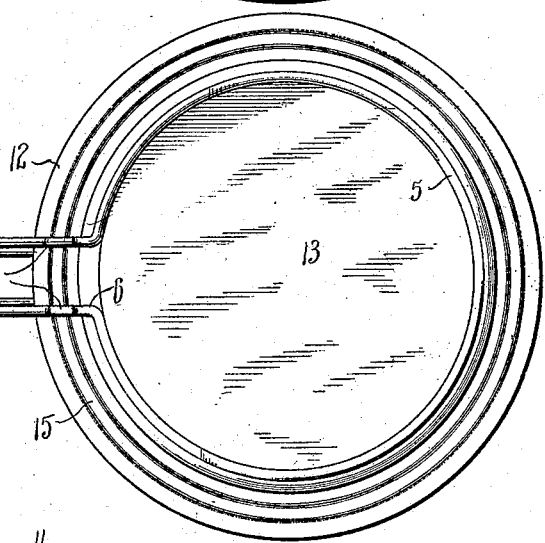
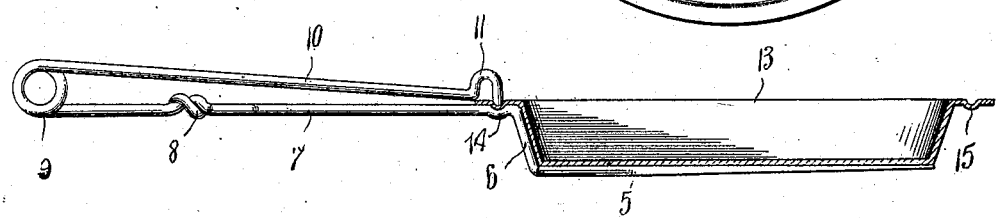
Witnesses
J. H. Crawford
Inventor
Ida E. Spry
By
Attorneys

UNITED STATES PATENT OFFICE.

IDA E. SPRY, OF AVILLA, MISSOURI.

PLATE-LIFTER.

No. 923,906.  Specification of Letters Patent.  Patented June 8, 1909.

Application filed April 2, 1909. Serial No. 487,417.

*To all whom it may concern:*

Be it known that I, IDA E. SPRY, a citizen of the United States, residing at Avilla, in the county of Jasper, State of Missouri, have invented certain new and useful Improvements in Plate-Lifters; and I do hereby declare the following to be a full, clear, and exact description of the invention, such as will enable others skilled in the art to which it appertains to make and use the same.

The invention relates to a plate lifter and more particularly to the class of lifter devices for introducing and removing pie plates from stove ovens.

The primary object of the invention is the provision of a plate lifter which is formed from a single strand of wire bent to provide a support for a plate, a handle portion and jaws for retaining the plate or holding the same upon the plate support so that the said plate can be readily and easily handled when hot to remove the same from the oven of a stove or other heating device.

Another object of the invention is the provision of a plate lifter which is adapted to receive and support a pie or other plate so that the same can be transported from one locality to another, and means for gripping the said plate to prevent the accidental displacement or dropping thereof from the lifter, and furthermore to enable a person to carry the plate with ease and without possibility of being burned by the direct handling thereof.

Another object of the invention is the provision of a plate lifter which is simple in construction, thoroughly reliable in operation, and economical and inexpensive in the manufacture.

With these and other objects in view the invention consists in the construction, combination, and arrangement of parts as will be hereinafter more fully described, illustrated in the accompanying drawings which disclose the preferred form of embodiment of the invention and as brought out in the claim hereunto appended.

It is to be understood that slight changes, variations and modifications may be made such as come properly within the scope of the appended claim without departing from the spirit of the invention.

In the drawings:—Figure 1 is a top plan view of the invention with a pie plate supported thereby. Fig. 2 is a bottom plan view. Fig. 3 is a side elevation with the pie plate shown in section.

Similar reference characters indicate corresponding parts throughout the several views in the drawings.

In the drawings there is shown a plate lifter comprising a single strand of relatively stiff wire, the same being bent intermediate its ends to form a substantially circular-shaped plate supporting portion 5, with adjacent upwardly inclined portions 6, terminating in a handle 7, the latter formed of spaced parallel portions twisted together as at 8 to strengthen the said handle. The handle 7, has its portions forming the same bent to provide double coils or convoluted portions 9, which latter serve to tension spaced parallel fingers or straight jaw portions 10, the latter terminating in hook extremities 11, to engage the channel or groove in an annular flange 12, of a pipe plate 13 which latter is of the ordinary or usual construction.

In the parallel portions of the handle 7, adjacent the inclined portion 6, are alining offsets 14, so as to accommodate the rib 15, formed by the channel or groove in the flange 12, of the pie plate and to enable the finger portions 10 of the lifter to securely grip the pie plate when resting upon the circular supporting portion 5, of the said lifter.

When it is desired to lift a pie plate or the like the said plate 13, is brought in a position upon the circular portion 5, and an operator grips the handle 7, and depresses the finger or jaw portions 10, so as to have their hook extremities 11, in the annular flange 12, of the plate 13, so that the latter will be firmly held in the lifter to enable the pie plate to be lifted and transported from one locality to another while in a heated state.

What is claimed is:—

A plate lifter comprising a single strand of wire bent to provide a substantially circular portion forming a plate support, the ends of said circular portion being upwardly inclined in parallel relation to each other, a handle integral with said upwardly inclined ends, and yieldable gripping fingers on said handle to engage the plate.

In testimony whereof, I affix my signature, in presence of two witnesses.

IDA E. SPRY.

Witnesses:
    JOHN W. POWELL,
    LEWIS E. SPRY.